US012699771B1

(12) United States Patent

Marili

(10) Patent No.: US 12,699,771 B1
(45) Date of Patent: Aug. 4, 2026

(54) AUTONOMOUS SOC—NEURO-COGNITIVE SECURITY ORCHESTRATION AND RESPONSE SYSTEM

(71) Applicant: Or Marili, Haifa (IL)

(72) Inventor: Or Marili, Haifa (IL)

( * ) Notice: Subject to any disclaimer, the term of this patent is extended or adjusted under 35 U.S.C. 154(b) by 0 days.

(21) Appl. No.: 19/319,268

(22) Filed: Sep. 4, 2025

(51) Int. Cl.
| | |
|---|---|
| *H04L 29/06* | (2006.01) |
| *G06F 18/21* | (2023.01) |
| *G06F 21/55* | (2013.01) |
| *G06F 21/56* | (2013.01) |
| *G06N 3/092* | (2023.01) |

(52) U.S. Cl.
CPC ........ *G06F 21/552* (2013.01); *G06F 18/2178* (2023.01); *G06F 21/56* (2013.01); *G06N 3/092* (2023.01)

(58) Field of Classification Search
CPC .... G06F 21/552; G06F 18/2178; G06F 21/56; G06N 3/092
See application file for complete search history.

(56) References Cited

U.S. PATENT DOCUMENTS

| | | | | |
|---|---|---|---|---|
| 2018/0367561 A1* | 12/2018 | Givental | ............. | H04L 63/1433 |
| 2021/0392146 A1* | 12/2021 | Lin | ........................ | G06F 21/552 |
| 2022/0263860 A1* | 8/2022 | Crabtree | ............. | H04L 63/1425 |
| 2023/0341822 A1* | 10/2023 | Maitra | ............... | G05B 13/0265 |
| 2025/0016183 A1* | 1/2025 | Sergeev | ............... | H04L 63/1441 |
| 2025/0124222 A1* | 4/2025 | Muhammad | ............ | G06F 40/20 |

* cited by examiner

*Primary Examiner* — William A Corum, Jr.

(57) ABSTRACT

The present invention discloses a neuro-cognitive cybersecurity orchestration and response system that enables autonomous, real-time decision-making within a security operations center (SOC). The system integrates telemetry agents, drift analysis engines, trust computation logic, reinforcement learning modules, and dynamic enforcement interfaces to form an adaptive control architecture. Unlike conventional rule-based SOAR systems, this invention performs real-time mitigation based on evolving cognitive and behavioral telemetry. The architecture supports closed-loop feedback and reinforcement-driven policy recalibration, enabling the SOC system to respond to threats such as phishing or lateral movement without human intervention. The design includes modular, hardware-executable components and enables deployment in hybrid and agentless environments, ensuring rapid and robust cyber defense. This technical solution to a technical problem is patent-eligible under USPTO guidelines.

26 Claims, 7 Drawing Sheets

AUTONOMOUS SOC—NEURO-COGNITIVE SECURITY ORCHESTRATION AND RESPONSE SYSTEM

FIELD OF THE INVENTION

The present invention relates to autonomous cybersecurity operations, and more particularly to a self-adaptive, AI-driven SOC (Security Operations Center) system capable of real-time decision-making, behavioral drift response, and neuro-cognitive orchestration without human intervention.

BACKGROUND OF THE INVENTION

Current Security Operations Centers (SOCs) rely on human analysts to triage alerts, correlate data, and respond to incidents. These systems are bottlenecked by human latency, scalability issues, alert fatigue, and inconsistent judgment. Existing orchestration and automation platforms (SOAR) are rule-based, static, and incapable of contextual cognitive interpretation. There exists a need for a truly autonomous SOC engine capable of ingesting cognitive behavioral telemetry, evaluating risk, and taking multi-layered defensive actions autonomously in real-time. The invention described herein addresses this need.

SUMMARY OF THE INVENTION

The present invention provides an autonomous SOC platform driven by neuro-cognitive telemetry. It integrates:—Input streams from endpoint telemetry agents and cognitive profiling engines-A trust-evolving decision model using reinforcement learning (RL)—A closed-loop orchestration engine that triggers policy-based mitigation actions. The system adapts dynamically to users' neuro-cognitive baselines and detects deviations in micro-behavioral patterns. Based on a calculated cognitive drift score and evolving contextual trust, the system enforces real-time autonomous decisions across integrated IT assets. The system eliminates reliance on human analysts, provides sub-second reaction times, and continuously improves its response patterns based on feedback. The invention may be deployed in cloud, hybrid, or on-premise architectures.

Distinction from Prior Related Applications:

While this invention builds upon prior systems—namely, AI Profile Sentinel, which focuses on behavioral anomaly detection, and SmartStealth Agent, which is dedicated to secure endpoint telemetry acquisition—the present invention introduces a fundamentally distinct system architecture and operational scope. Unlike these prior inventions, the present invention does not merely detect anomalies or collect telemetry. It performs autonomous, real-time enforcement actions based on neuro-cognitive drift analysis, dynamic trust recalibration, and reinforcement learning-driven decision logic.

The invention introduces a novel Reinforced Adaptation Layer that integrates telemetry, context, and historical feedback into an autonomous decision-making engine. This enables real-time mitigation of security threats without relying on predefined playbooks or human analysts. Accordingly, the Autonomous SOC operates as an independent control layer that orchestrates and executes adaptive security responses in real time-establishing a clear and non-obvious technological advancement over the prior systems. Unlike conventional SOAR systems that rely on static playbooks or deterministic decision trees, the present invention achieves true autonomy by embedding a Reinforced Adaptation Layer that continuously recalibrates enforcement policies based on neuro-cognitive drift scores, contextual trust signals, and closed-loop outcome feedback. This design departs fundamentally from rule-based automation and cannot be realized by merely combining existing SOAR platforms with machine learning models. As such, the invention provides a non-obvious and concrete technological improvement in autonomous security orchestration.

DETAILED DESCRIPTION OF THE INVENTION

The present invention discloses a system and method for autonomous security orchestration leveraging cognitive drift detection, trust computation, and neuro-cognitive reinforcement learning. The invention introduces a multi-layered decision architecture comprising endpoint telemetry processing, behavioral profiling, and autonomous response execution across hybrid infrastructures.

A key component of the invention is a closed-loop feedback mechanism that integrates real-time outcome data into future policy adaptation. This feedback system enables the system to continuously refine its mitigation strategy based on historical success patterns and contextual parameters, thus achieving adaptive defense at scale.

To further enhance response optimization, the invention introduces a Reinforced Adaptation Layer-a hierarchical learning module built upon reinforcement learning foundations. This layer receives inputs from the cognitive drift engine, trust computation unit, and feedback loop module, and outputs real-time policy adjustments with optimized confidence levels.

The Reinforced Adaptation Layer operates by assigning weighted scores to various action-outcome pairs based on context, environmental parameters, and historical response effectiveness. It employs reward functions not only tied to success metrics but also penalizes overreactions and underreactions in dynamic threat environments.

The layer enables:

Dynamic strategy switching under high-drift conditions.

Real-time recalibration of trust thresholds.

Autonomous exploration of alternative mitigation paths with confidence scoring.

Continuous learning loops embedded within the SOC workflow.

This architecture ensures that the system does not rely on static rules or fixed confidence intervals, but rather evolves through contextual feedback and environmental learning cycles, thus closing the cognitive-response loop.

ADVANTAGES OVER PRIOR ART

The present invention offers several distinct advantages over prior art systems in the field of security orchestration and automated response:

1. Closed-loop cognitive feedback integration; Unlike traditional SOAR platforms that rely on static rule sets or fixed confidence thresholds, this invention introduces a continuous feedback loop that dynamically incorporates real-world response outcomes into future mitigation decisions. This approach enables self-correcting behavior and contextual learning over time.

2. Reinforced Adaptation Layer; The invention introduces a hierarchical reinforcement learning module that autonomously adjusts security policies based on outcome evaluation, drift patterns, and trust variations. This layer is absent in legacy systems and offers an evolving strategy model instead of static response playbooks.

3. Multi-dimensional trust recalibration; The invention leverages a multi-source trust computation engine that recalibrates confidence levels in real time based on user behavior, threat actor profiles, and environmental context. Prior art systems typically lack such multi-dimensional trust re-evaluation during live operations.

4. Context-aware strategy switching; The system supports autonomous switching between defensive strategies based on cognitive drift levels and feedback loop data. This contrasts with earlier methods that apply fixed mitigation paths regardless of contextual shifts in threat behavior.

5. Exploratory mitigation with confidence scoring; The system is capable of exploring and validating alternative mitigation paths, assigning confidence scores based on observed effectiveness. This contrasts with rigid decision-tree approaches prevalent in earlier orchestration engines.

6. Adaptive threshold control; Instead of relying on pre-set static thresholds, the system dynamically adjusts decision thresholds based on cumulative feedback, observed risk evolution, and organizational response posture. Prior systems are limited in this adaptive capability.

7. Cognitive-response synchronization; The invention aligns detection confidence with neuro-cognitive user behavior patterns, enabling a high-fidelity response system that reduces false positives and under-reactions-capabilities not found in traditional SOC automation tools.

8. Departure from Rule-Based Paradigms: Conventional SOAR and automation tools, even when augmented with basic machine learning, remain bound by static playbooks, fixed thresholds, or rigid escalation paths. In contrast, the present invention incorporates a Reinforced Adaptation Layer that continuously evolves by leveraging drift scoring, trust recalibration, and historical feedback loops. This dynamic learning capability creates a fundamentally distinct architecture, achieving true cognitive autonomy in orchestration. Such an advancement is not an obvious extension of prior systems and provides a clear technological leap beyond the state of the art.

Collectively, these capabilities form a next-generation autonomous SOC platform that evolves over time, aligns with human-like decision cycles, and surpasses the reactive nature of prior security automation solutions.

4

Figure 7:
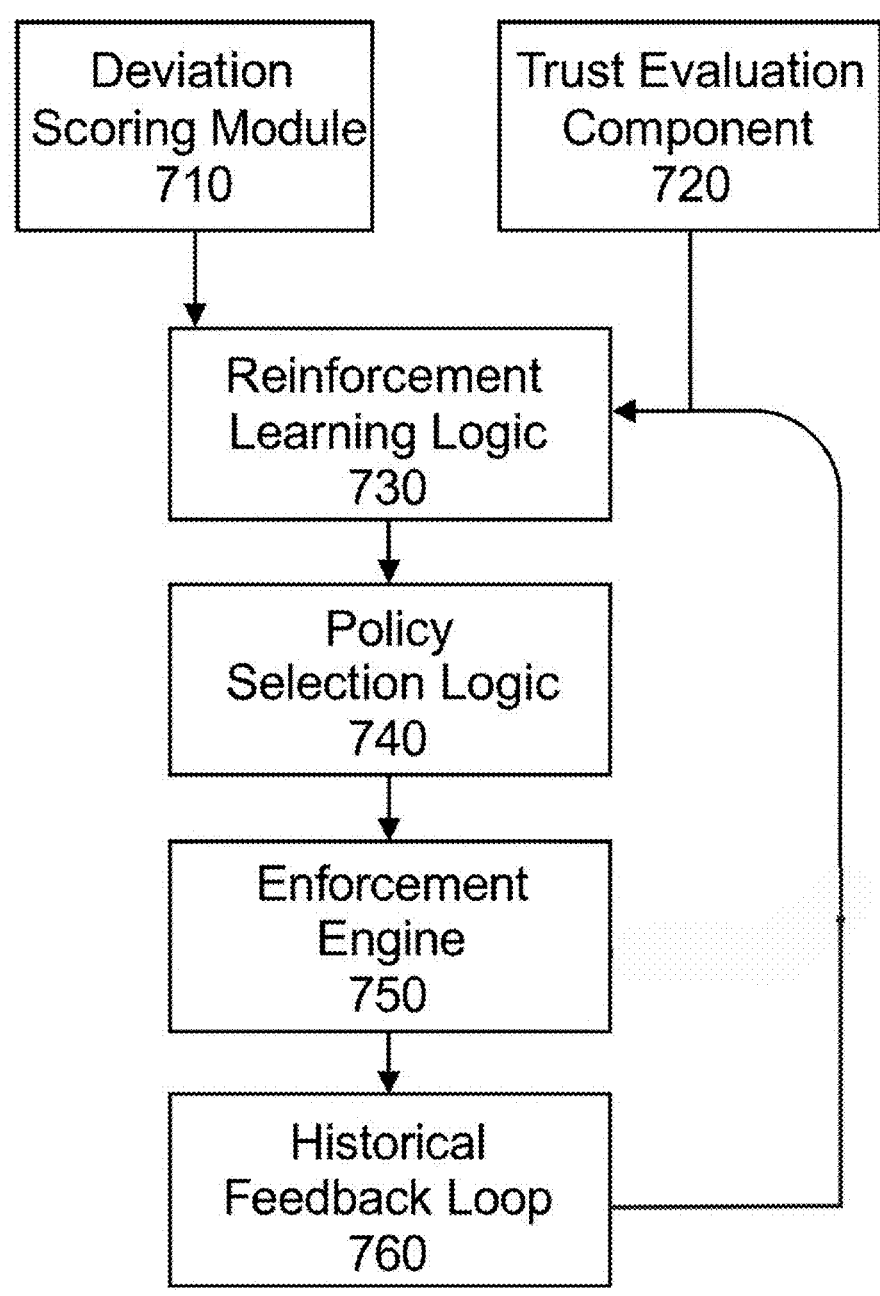

FIG. 7 illustrates a flow diagram of the Reinforced Adaptation Layer, including deviation scoring (710), trust evaluation (720), reinforcement learning logic (730), policy selection logic (740), enforcement engine (750), and a historical feedback loop (760) forming a closed-loop autonomous decision-making system.

DETAILED DESCRIPTION OF THE DRAWINGS

Figure 1:
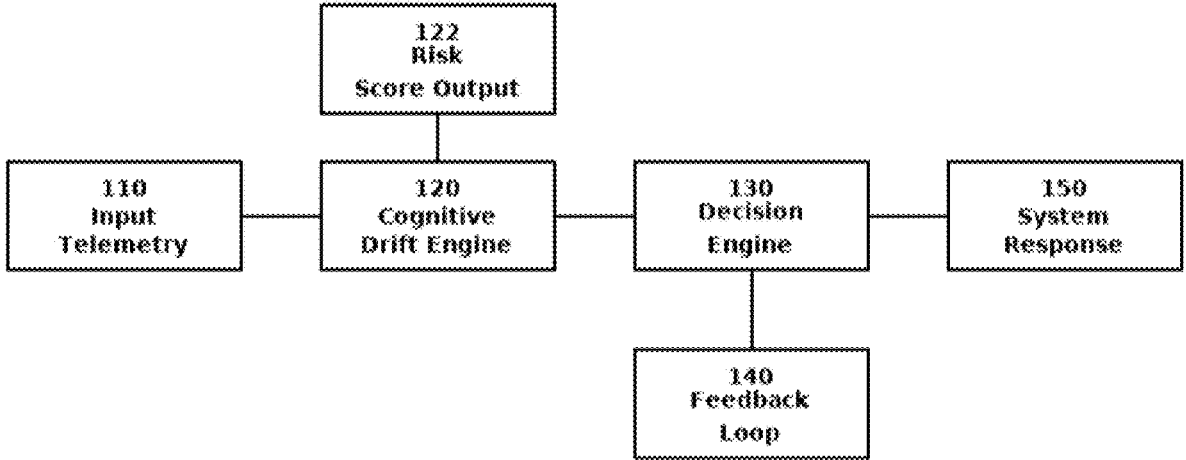
FIG. 1 illustrates a high-level system architecture of the autonomous SOC, including input telemetry streams, cognitive drift engine, decision model, and policy orchestration engine.

FIG. 1 depicts the autonomous SOC system. Input telemetry streams (110) from SmartStealth Agent and AI Profile Sentinel feed into the cognitive drift engine (120). The drift engine (120) computes neuro-cognitive deviations and generates risk scores (122). These are passed into the neuro-cognitive decision engine (130).

Figure 2:
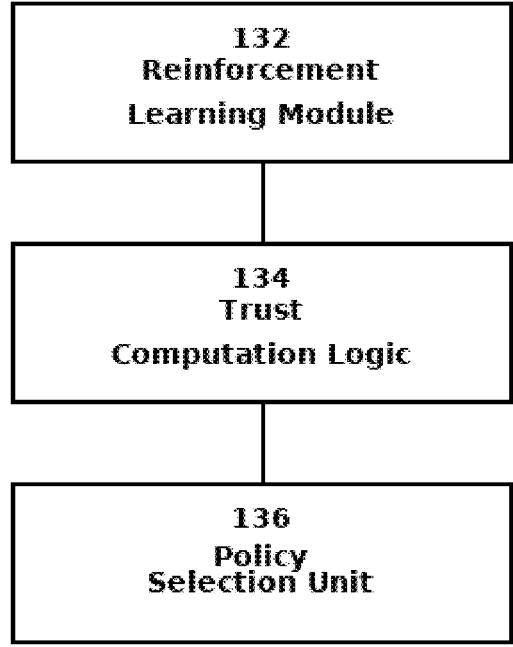
FIG. 2 illustrates the internal components of the Neuro-Cognitive Decision Engine, including the reinforcement learning module, trust computation logic, and policy selection unit.

FIG. 2 expands on the decision engine (130). It includes a reinforcement learning module (132) trained on past responses and outcomes, a trust computation logic (134) calculating contextual trust per user session, and a policy selection unit (136) that maps scores to mitigation actions.

Figure 3:
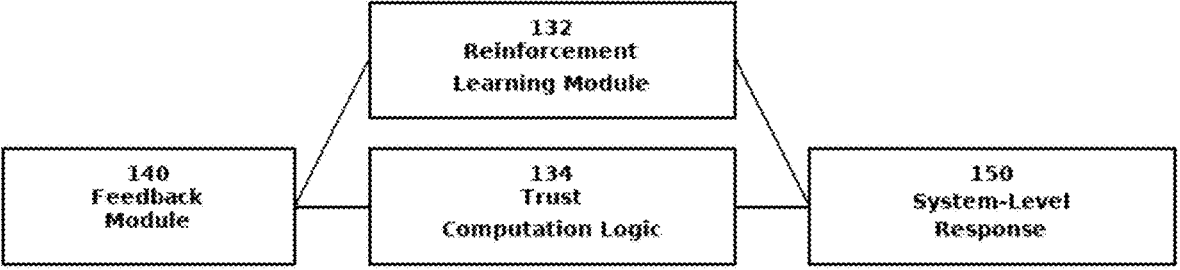
FIG. 3 shows a feedback loop enabling the system to adjust policy actions based on real-time results and evolving user profiles.

FIG. 3 illustrates a closed-loop feedback module (140) that receives execution data from system-level responses (150). The loop refines the RL model (132) and trust scores (134) based on outcome validation, enhancing future response precision.

Figure 4:
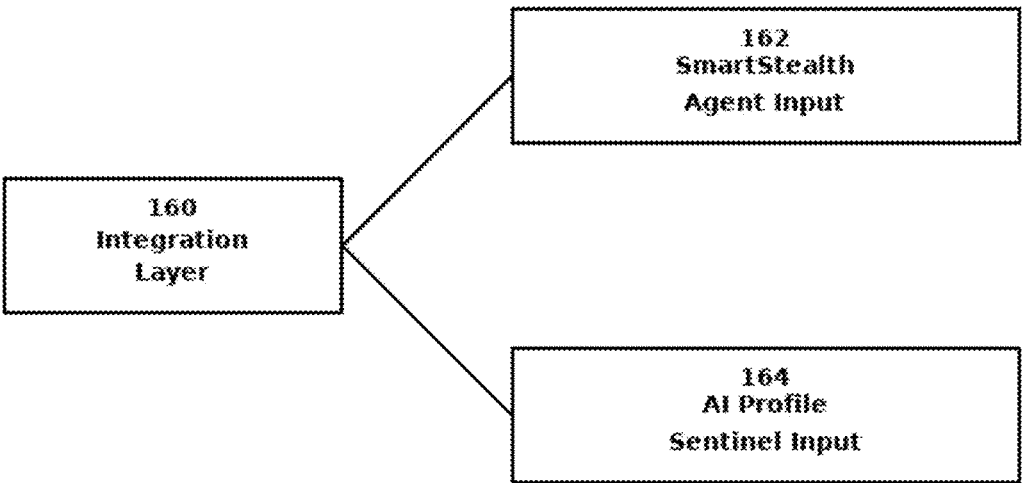
FIG. 4 shows integration with SmartStealth Agent and AI Profile Sentinel modules as external data sources.

FIG. 4 shows system interoperability via integration layer (160), which interfaces with SmartStealth Agent (162) for endpoint signals and AI Profile Sentinel (164) for cognitive behavior profiles. This layer unifies external insights into the autonomous core.

Figure 5:
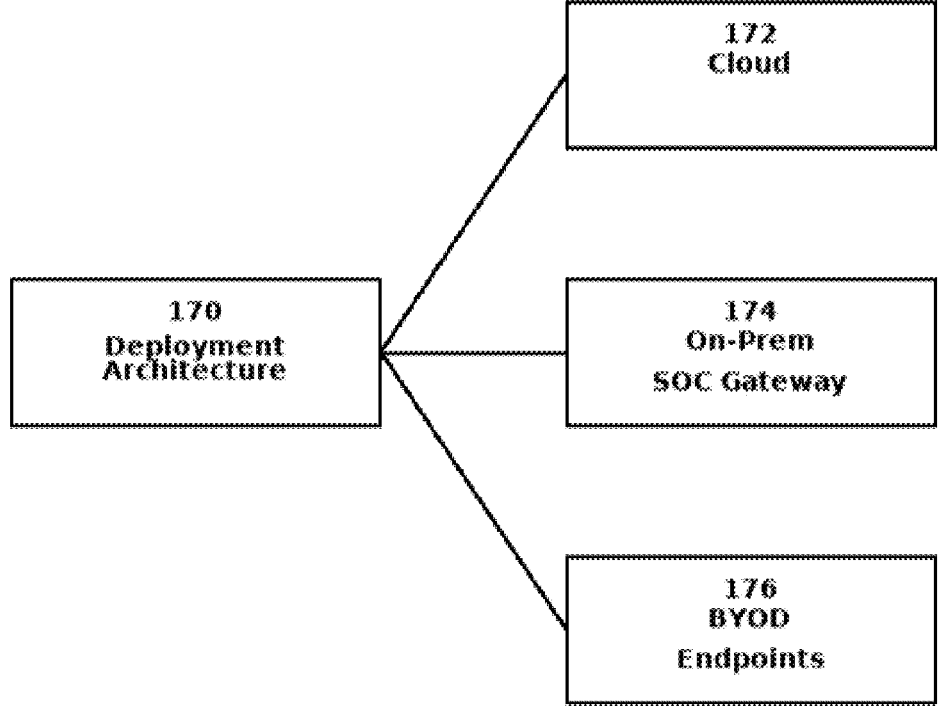
FIG. 5 illustrates a deployment scenario across a hybrid enterprise environment (cloud, on-premise, BYOD).

FIG. 5 demonstrates a deployment configuration (170) spanning cloud servers (172), on-prem SOC gateways (174), and user endpoints (BYOD) (176), allowing for flexible adaptation and layered enforcement across hybrid environments.

Figure 6:
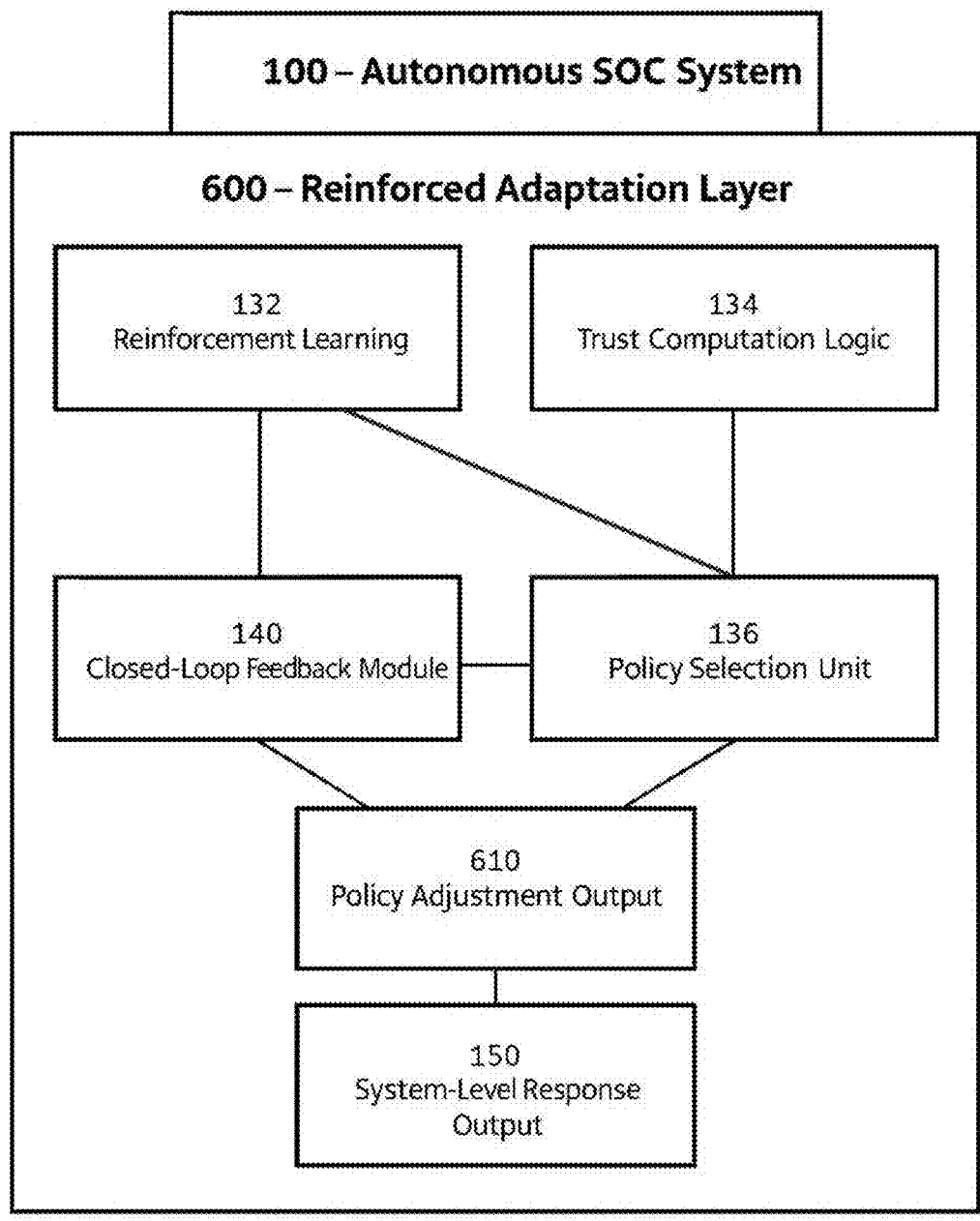
FIG. 6 illustrates the Reinforced Adaptation Layer, showing the reinforcement learning module, trust computation logic, closed-loop feedback integration, and policy adjustment outputs that together enable adaptive decision-making in the autonomous SOC system.

FIG. 6 depicts the Reinforced Adaptation Layer (600) of the autonomous SOC system (100). The layer integrates multiple cognitive decision components into a hierarchical adaptation module. The reinforcement learning module (132) receives input from the closed-loop feedback module (140) and historical response data. The trust computation logic (134) provides contextual trust metrics that influence weighting of decisions. The policy selection unit (136) receives both reinforcement learning outputs and trust logic adjustments, generating policy adjustment outputs (610). These outputs recalibrate risk thresholds and enforcement strategies dynamically. The layer enables continuous refinement of decision parameters, including dynamic strategy switching, trust threshold recalibration, and exploration of alternative mitigation paths, thereby forming a self-evolving adaptation mechanism within the SOC workflow. Example for Operational Use Case-Phishing Attack Mitigation; In a real-world scenario, the autonomous SOC system (100) is deployed within a large enterprise network. A telemetry agent (120) detects unusual user behavior involving an access request to a rarely used financial portal outside typical hours. The drift engine (126) registers cognitive deviation based on historical neuro-cognitive telemetry and signals the closed-loop feedback module (140). The trust computation logic (134) calculates a reduced trust score for the user session, considering contextual cues and behavioral deviation. The reinforcement learning module (132), referencing prior responses and outcomes, suggests escalation of the policy state. The policy selection unit (136) dynamically generates a policy adjustment output (610), switching from passive monitoring to active mitigation. The enforcement interface (150) executes a real-time policy action: temporary suspension of access and a secondary identity validation prompt. Simultaneously, the decision is logged into the feedback loop for future policy refinement. This example illustrates how the invention performs end-to-end autonomous cognitive decision-making without human intervention, adapting to evolving threats with contextual intelligence.

FIG. 7 provides a flow diagram representation of the Reinforced Adaptation Layer. The layer receives inputs from a deviation scoring module (710) and a trust evaluation component (720), which together inform a central reinforcement learning logic unit (730). The outputs of the reinforcement learning logic, adjusted by historical data from a feedback loop (760), are processed by a policy selection logic module (740). The selected enforcement policy is executed by an enforcement engine (750), and the results are routed back to the feedback loop (760) to support continuous adaptation. This closed-loop structure allows for self-tuning, autonomous security enforcement based on cognitive drift and trust recalibration.

SERIAL LEGEND FOR DRAWINGS

100—Autonomous SOC system
110—Input Telemetry Stream
120—Cognitive Drift Engine
122—Risk Score Output
130—Neuro-Cognitive Decision Engine
132—Reinforcement Learning Module
134—Trust Computation Logic
136—Policy Selection Unit
140—Closed-Loop Feedback Module
150—System-Level Response Output
160—Integration Layer
162—SmartStealth Agent Input
164—AI Profile Sentinel Input
170—Deployment Architecture
172—Cloud Servers
174—On-Prem SOC Gateway
176—BYOD Endpoints
600—Reinforced Adaptation Layer
610—Policy Adjustment Output
710—Deviation Scoring Module
720—Trust Evaluation Component
730—Reinforcement Learning Logic
740—Policy Selection Logic
750—Enforcement Engine
760—Historical Feedback Loop

The invention claimed is:

1. An autonomous neuro-cognitive security orchestration and response system, comprising: one or more processors and a memory storing instructions that, when executed by the one or more processors, cause the system to perform operations including:

receiving, via a telemetry collection interface, behavioral telemetry data associated with one or more user sessions, the behavioral telemetry data being obtained from at least one of endpoint-based telemetry agents or cognitive profiling systems;

analyzing the received behavioral telemetry data to compute a cognitive drift score representing a deviation from a historical neuro-cognitive baseline associated with a monitored user or entity;

computing, based on the cognitive drift score and contextual session information, a session-specific trust score indicative of a current trust posture of the monitored user or entity;

determining, using a reinforcement learning-based decision process, an adaptive enforcement policy by evaluating the cognitive drift score, the session-specific trust score, and historical outcome feedback associated with prior enforcement actions;

generating, based on the adaptive enforcement policy, a policy adjustment output specifying one or more security enforcement actions selected from access restriction, session suspension, adaptive authentication, or resource isolation;

executing, via an enforcement interface coupled to one or more enterprise IT assets, the one or more security enforcement actions specified by the policy adjustment output; and updating, using outcome data resulting from execution of the one or more security enforcement actions, at least one of: (i) parameters of the reinforcement learning-based decision process, or (ii) trust threshold values associated with the session-specific trust score, wherein the system operates in a closed-loop feedback architecture that continuously refines enforcement policy selection based on observed behavioral outcomes without requiring human analyst intervention.

2. The system of claim 1, wherein the behavioral telemetry data comprises at least one of typing cadence, cursor movement dynamics, application interaction timing, or response latency.

3. The system of claim 1, wherein the cognitive drift score is computed by comparing real-time behavioral telemetry data to a stored historical neuro-cognitive baseline associated with the monitored user or entity.

4. The system of claim 1, wherein the session-specific trust score is computed using a weighted combination of the cognitive drift score and contextual session parameters including time-of-day, access context, or resource sensitivity.

5. The system of claim 1, wherein the reinforcement learning-based decision process assigns reward values to enforcement outcomes based on observed effectiveness of prior security enforcement actions.

6. The system of claim 1, wherein the policy adjustment output specifies a graduated enforcement action selected based on a severity level associated with the session-specific trust score.

7. The system of claim 1, wherein the enforcement interface is configured to interact with at least one of identity and access management systems, network access control systems, or application-level access control components.

8. The system of claim 1, wherein the closed-loop feedback architecture updates the reinforcement learning-based decision process using outcome data indicative of success or failure of executed enforcement actions.

9. The system of claim 1, wherein the system autonomously performs the operations without requiring manual review or approval by a human security analyst.

10. A method for autonomous neuro-cognitive security orchestration and response, comprising: receiving, by one or more processors, behavioral telemetry data associated with an active user session, the behavioral telemetry data being obtained from at least one of an endpoint-based telemetry agent or a cognitive profiling system;

computing, based on the behavioral telemetry data, a cognitive drift score representing a deviation of the active user session from a historical neuro-cognitive baseline associated with a monitored user or entity;

computing, based on the cognitive drift score and contextual session information, a session-specific trust score indicative of a current trust posture of the monitored user or entity; selecting, using a reinforcement learning-based decision process, an adaptive enforcement policy by evaluating: (i) the cognitive drift score, (ii) the session-specific trust score, and (iii) historical outcome feedback derived from prior security enforcement actions;

generating, based on the selected adaptive enforcement policy, a policy adjustment output specifying one or more security enforcement actions; automatically executing, in real time and without human analyst intervention, at least one of the one or more security enforcement actions on one or more enterprise IT assets associated with the active user session; and updating, using outcome data resulting from execution of the at least one security enforcement action, at least one of: (a) parameters of the reinforcement learning-based decision process, or (b) trust threshold values used to compute the session-specific trust score, wherein the method is performed as a closed-loop feedback process that autonomously refines future enforcement policy selection based on observed behavioral outcomes.

11. The method of claim 10, wherein the behavioral telemetry data comprises at least one of typing cadence, cursor micro-movements, application focus transitions, or interaction response timing.

12. The method of claim 10, wherein computing the cognitive drift score comprises comparing real-time behavioral telemetry data to a historical neuro-cognitive baseline associated with the monitored user or entity.

13. The method of claim 10, wherein computing the session-specific trust score comprises weighting the cognitive drift score based on contextual session parameters including access location or resource classification.

14. The method of claim 10, wherein the reinforcement learning-based decision process evaluates enforcement outcomes using reward signals derived from observed behavioral normalization following execution of enforcement actions.

15. The method of claim 10, wherein executing the at least one security enforcement action comprises modifying access privileges associated with the active user session.

16. The method of claim 10, wherein executing the at least one security enforcement action comprises initiating adaptive authentication for the active user session.

17. The method of claim 10, wherein updating the parameters of the reinforcement learning-based decision process comprises adjusting policy selection preferences based on historical enforcement effectiveness.

18. The method of claim 10, wherein updating the trust threshold values comprises recalibrating acceptable deviation ranges associated with the session-specific trust score.

19. The method of claim 10, wherein the closed-loop feedback process operates continuously during the active user session.

20. The method of claim 10, wherein the method is performed without generating enforcement recommendations requiring human approval.

21. The method of claim 10, wherein the behavioral telemetry data is received from at least one of an endpoint-based telemetry agent or an agentless telemetry source.

22. The method of claim 10, wherein the reinforcement learning-based decision process is initialized using historical enforcement outcome data.

23. The method of claim 10, wherein the policy adjustment output specifies enforcement actions with varying degrees of restrictiveness based on the session-specific trust score.

24. The method of claim 10, wherein the enforcement actions are executed in real time on enterprise IT assets associated with the active user session.

25. The method of claim 10, wherein the closed-loop feedback process refines future enforcement policy selection using outcome data aggregated across multiple user sessions.

26. The method of claim 10, wherein the method autonomously adapts enforcement behavior over time without reliance on predefined static response playbooks.

* * * * *